(12) United States Patent
Robins

(10) Patent No.: US 8,000,696 B2
(45) Date of Patent: Aug. 16, 2011

(54) METHOD FOR ACCURATE TIME SETTING OF COMMUNICATION DEVICE OVER THE AIR AND CORRESPONDING COMMUNICATION DEVICE

(75) Inventor: Mark Robins, Kesgrave (GB)

(73) Assignee: Actaris U.K. Limited, Felixstowe, Suffolk (GB)

( * ) Notice: Subject to any disclaimer, the term of this patent is extended or adjusted under 35 U.S.C. 154(b) by 1083 days.

(21) Appl. No.: 11/710,603

(22) Filed: Feb. 23, 2007

(65) Prior Publication Data
US 2007/0238456 A1 Oct. 11, 2007

(30) Foreign Application Priority Data
Mar. 22, 2006 (GB) .................................. 0605790.5

(51) Int. Cl.
*H04W 4/00* (2009.01)
*H04M 1/00* (2006.01)
(52) U.S. Cl. .................................. 455/422.1; 455/550.1
(58) Field of Classification Search ................ 455/422.1, 455/436, 550.1, 466, 418, 437, 414.1; 370/503, 370/507, 508, 509, 510, 511, 512, 513, 514, 370/515–520, 340
See application file for complete search history.

(56) References Cited

U.S. PATENT DOCUMENTS

| | | | |
|---|---|---|---|
| 7,164,662 B2 * | 1/2007 | Preston et al. | 370/328 |
| 2003/0101329 A1 * | 5/2003 | Lahti et al. | 712/1 |
| 2004/0103174 A1 * | 5/2004 | Balducci et al. | 709/221 |
| 2004/0109436 A1 * | 6/2004 | Vargas et al. | 370/350 |
| 2004/0116119 A1 * | 6/2004 | Lewis et al. | 455/435.1 |
| 2005/0094618 A1 * | 5/2005 | Colban et al. | 370/350 |
| 2007/0263709 A1 * | 11/2007 | Kasslin et al. | 375/222 |

FOREIGN PATENT DOCUMENTS

| | | |
|---|---|---|
| FR | 2840500 | 12/2003 |
| GB | 2325589 | 11/1998 |
| WO | WO0163890 | 2/2001 |

OTHER PUBLICATIONS

International Search Report—Apr. 7, 2008.

* cited by examiner

*Primary Examiner* — Melody Mehrpour
(74) *Attorney, Agent, or Firm* — Dority & Manning, P.A.

(57) ABSTRACT

A method for accurate time setting of a communication device (2, 3) in which said communication device (2, 3) sends (A0) a request for time synchronization to a central communications unit (1) through communication data packets via a cellular telephone network (5); said central communications unit (1) sends current time in a response to said communication device (2, 3) through communication data packets via the cellular telephone network (5); said communication device (2, 3) measures (A2) an elapsed time (T) from sending said request to receiving the response and compares said measured elapsed time (T) with a predetermined first configuration parameter ("Trip"); and, When said measured elapsed time (T) is less than said first configuration parameter ("Trip"), said communication device (2, 3) uses (A3) received current time for updating its own time reference.

9 Claims, 2 Drawing Sheets

METHOD FOR ACCURATE TIME SETTING OF COMMUNICATION DEVICE OVER THE AIR AND CORRESPONDING COMMUNICATION DEVICE

RELATED APPLICATION

This application is related to and claims the benefit of priority from United Kingdom Patent Application No. 0605790.5, filed on Mar. 22, 2006, the entirety of which are incorporated herein by reference.

FIELD OF THE INVENTION

The present invention relates to a method for accurate time setting of communication devices over the air, and to a corresponding communication device.

BACKGROUND

For some communication devices which have to transmit real time data or at least data in correspondence with a given time, it is necessary to provide an accurate real time clock. This can be done remotely by sending over the air information for setting an accurate real time clock.

It is the case for instance in the domain of utility electricity meters, in which different regulations and demands for accuracy of the real time clock exist in different countries. In Sweden, where there is a strong demand for communicating meters, it is a legal requirement for some types of meters to be programmed within ten seconds of the actual date and time. Some customers even demand a higher accuracy than this, and require that the real time clock is programmed within seven second of the actual date and time when their clock is set remotely. In many communication systems, there are predictable delays between sending data to a remote device and the device receiving the data, allowing the time and date to be set on the device by a communication system reliably. However, in other communication systems of the type using GPRS or SMS bearers over a radio communication network, this is not the case. More generally, when data are transmitted over a radio communication network through communication packet data, it is not possible to rely on the delivery time for data.

OBJECTS AND SUMMARY

An aim of the invention is to remedy the above drawback by proposing a solution enabling the remote setting over the air of an accurate real time clock in a communication packet data system.

To this aim, an aspect of the present invention is a method for accurate time setting of a communication device, characterized in that it comprises the following steps:

Said communication device sends a request for time synchronization to a central communications unit through communication data packets via a cellular telephone network;

Said central communications unit sends current time in a response to said communication device through communication data packets via the cellular telephone network;

Said communication device measures an elapsed time from sending said request to receiving the response and compares said measured elapsed time with a predetermined first configuration parameter;

When said measured elapsed time is less than said first configuration parameter, said communication device uses received current time for updating its own time reference.

Said received current time may be disregarded when said measured elapsed time is greater than said first configuration parameter.

Alternatively, a new request for time synchronization may be sent as long as the total number of requests is not equal to a second predetermined configuration parameter and said measured elapsed time is greater than or equal to said first configuration parameter.

Request and response can be sent using protocols such as GPRS or SMS.

A second aspect of the invention is a communication device, characterized in that it comprises:

Means for sending a request for time synchronization to a central communications unit through communication data packets via a cellular telephone network;

Means for receiving current time in a response from said central communications unit through communication data packets via the cellular telephone network;

Means for measuring an elapsed time from sending said request to receiving the response and comparing said measured elapsed time with a predetermined first configuration parameter;

Means for updating the communication device's own time reference using received current time when said measured elapsed time is less than said first configuration parameter.

In one possible embodiment, said means for sending a request and for receiving a response comprise a GPRS/SMS interface.

Said communication device may be used as utility meter or as utility meter interface unit linked to several utility meters. Indeed, a further aspect of the invention provides a utility meter comprising the communication device of the previous aspect.

BRIEF DESCRIPTION OF THE DRAWINGS

Features and advantages of the invention will become apparent from the following description of the invention given by way of non-limiting examples only and with reference to the accompanying drawings, in which.

DETAILED DESCRIPTION

Figure 1:
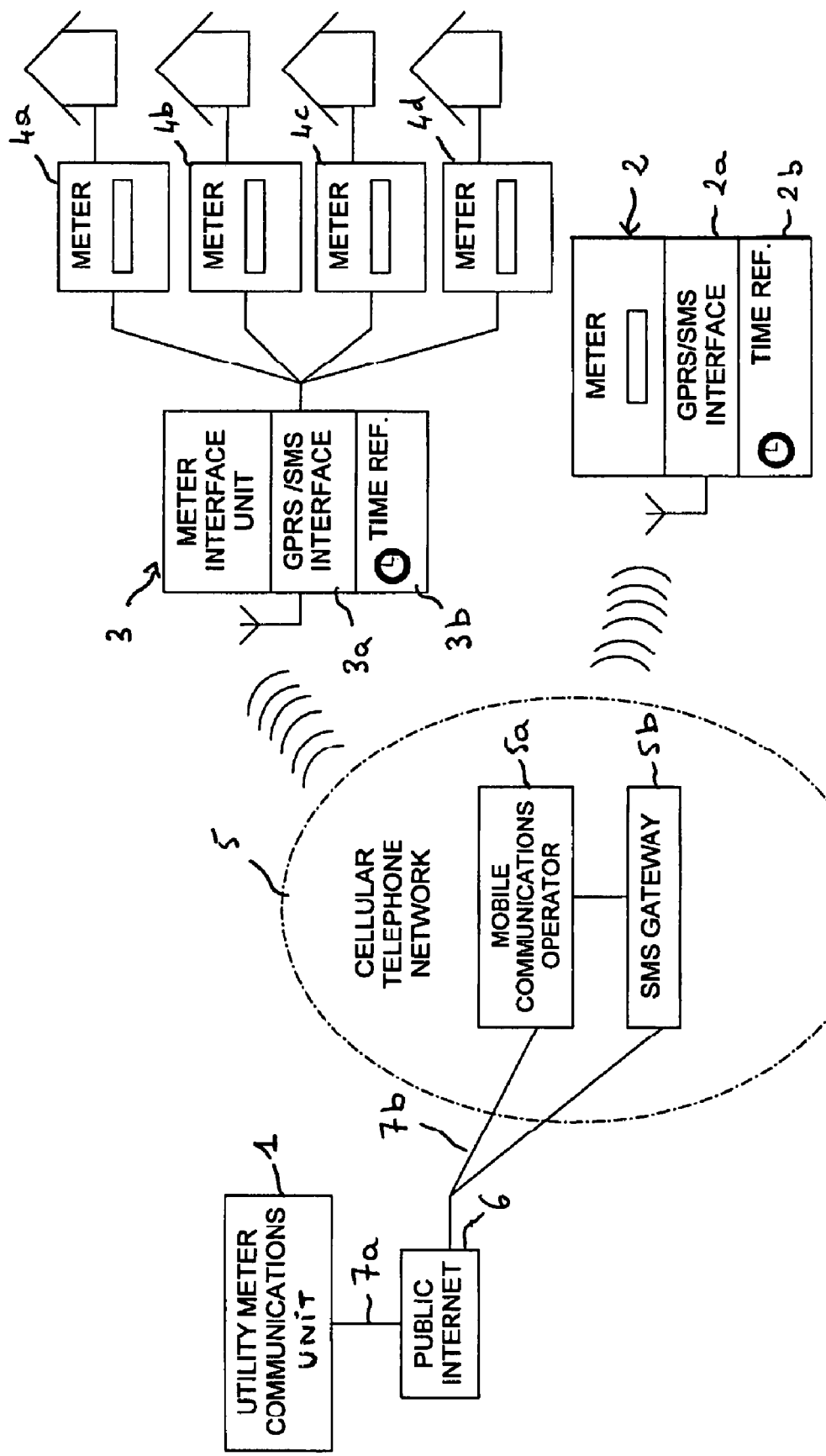
FIG. 1 shows a simplified block diagram illustrating communication of data in a utility meter communication system.

FIG. 1 shows schematically a global architecture of a communication system enabling exchanges of communication packet data between a central utility meter communications unit 1 and several communication devices 2, 3. In the described example, communications are performed over GPRS (acronym for General Packet Radio System) or SMS (acronym for Short Message Service), but other kinds of communication through packet data may be used.

Communication device may be a utility meter device 2 with a built-in GPRS/SMS interface 2a for enabling GPRS/SMS communication.

Alternatively, communication device may be a utility meter interface unit 3 with a built-in GPRS/SMS interface 3a, which is linked to one or more slave utility meter devices 4a to 4d.

Each communication device 2, 3 has an internal time reference 2b, 3b which keeps track of the current date and time with an electronic real time clock.

Exchanges of data between central communication unit 1 and communication devices 2 or 3 are performed over the air through a cellular telephone network 5. Between cellular telephone network 5 and communication devices 2, 3, communications are performed via wireless links. Between central communication unit 1 and cellular telephone network 5, communications are performed over public internet 6 via TCP/IP links 7a,7b either through a mobile communication operator 5a of cellular network 5 in case of GPRS, or through both said operator 5b and a SMS gateway 5b in case of SMS communication.

Figure 2:
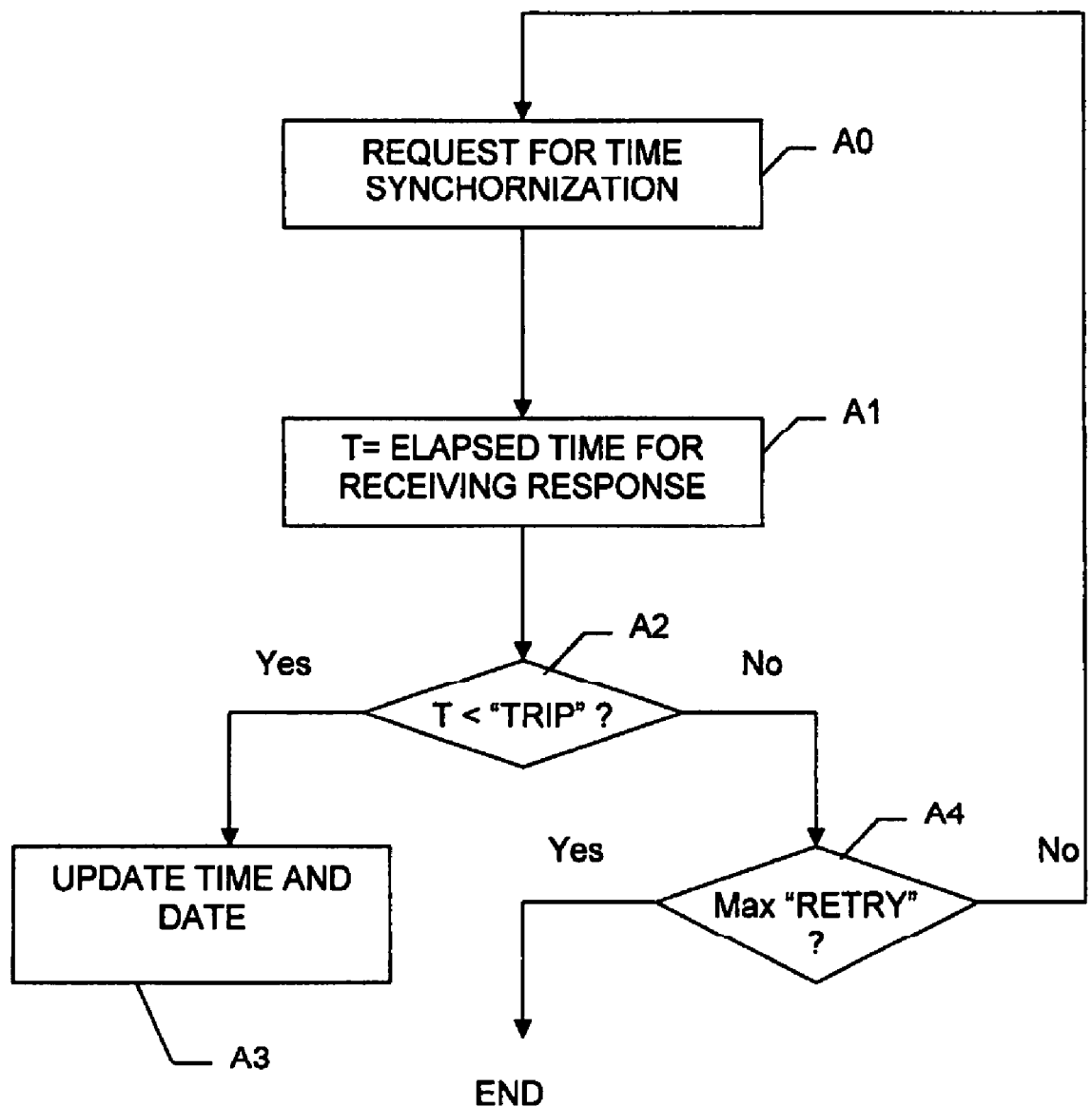
FIG. 2 shows different steps involved in the method according to the invention.

The method for accurate time setting of utility meter device 2 or utility meter interface unit 3 according to the invention will now be described in reference with FIG. 2:

In first step A0, utility meter device 2 or utility meter interface unit 3 first initiate a communication over either GPRS or SMS by sending a request for time synchronization to central utility meter communications unit 1.

In the case of GPRS communications, meter device 2 or interface unit 3 will send said request for time synchronization using TCP/IP protocols. This will be routed over GPRS from GPRS/SMS interface 2a or 3a through cellular telephone network 5. Mobile communications operator 5a provides a TCP/IP connection 7b from cellular telephone network 5 through to public internet 6. Utility meter communications unit 1 is connected to public internet through a public internet service provider, providing direct TCP/IP access 7a.

In the case of SMS communications, request for time synchronization is sent inside one or more SMS messages directed to a utility's SMS account hosted by mobile communications operator 5a. This will be routed over SMS from GPRS/SMS interface 2a or 3a through cellular telephone network 5. Mobile communications operator 5 provides a TCP/IP connection 7b from SMS Gateway 5b through to public internet 6, and public internet service provider provides direct TCP/IP access 7a to central utility meter communications unit 1.

In both cases however, access to GPRS or SMS within the cellular telephone network 5 depends on base station availability, and so the time taken to forward data is variable and cannot be reliably determined. The same problem of delay may occur for the response to be received.

To overcome this, the method according to invention requires utility meter device 2 or utility meter interface unit 3 to validate that the time and date received in the response sent by central unit 1 is received in a time period which guaranties the required accuracy. More precisely, meter device 2 or interface unit 3, after having sent the request for the date and time from an accurate time source, times how long it takes to receive a response. This corresponds on FIG. 2 to step A1 in which device 2 or interface unit 3 has measured an elapsed time T for receiving a response.

In a subsequent step A2, device 2 or interface unit 3 compares said measured elapsed time T with a first predetermined configuration parameter "TRIP", which has been stored inside a memory (not shown) of device 2 or interface unit 3, and which corresponds to the maximum communication round trip time which guaranties an accurate time and date synchronization.

If the response arrives within the maximum communication round trip time "<Trip>", then device 2 or unit 3 will update, in a step A3, its own date and time reference 2b or 3b with the time and date sent by the system, adjusted by subtracting half the actual round trip time. Meter interface unit 3 is then able to update any slave meters 4a-4d that support time synchronization at any time based on its own time reference 3b.

If, on the contrary, the response is not received within said configurable time period, then the time and date data received in the response are disregarded. In this case, device 2 or unit 3 may automatically retry by sending a new request for time synchronization. In order to minimize the communication bandwidth requirements in a preferred embodiment of the invention, a second configuration parameter "RETRY" is stored in unit 3 or device 2, in order to give the maximum number of times a request for time synchronization can be sent. If after all retries, device 2 or unit 3 still hasn't received a response within "<Trip>", then it will continue to operate with its internal time and date. This preferred solution is referred to step A4 on FIG. 2.

Thanks to the invention, it is possible to synchronize a GSM/SMS-enabled device's clock at the same time as sending data, with very little communication overhead. This technique can be applied to any system where accurate time and date programming is required, and data delivery time is unpredictable.

The invention claimed is:

1. A method for accurate time setting of a communication device comprising the steps of:
   sending a request for time synchronization from said communication device to a central communications unit through communication data packets via a cellular telephone network;
   sending current time from said central communications unit in a response to said communication device through communication data packets via the cellular telephone network; and
   measuring an elapsed time at said communication device from sending said request to receiving the response and comparing said measured elapsed time with a predetermined first configuration parameter,
   wherein when said measured elapsed time is less than said first configuration parameter, said communication device uses received current time for updating its own time reference.

2. A method according to claim 1, wherein said received current time is disregarded when said measured elapsed time is greater than said first configuration parameter.

3. A method according to claim 1, wherein a new request for time synchronization is sent as long as the total number of requests is not equal to a second predetermined configuration parameter and said measured elapsed time is greater than or equal to said first configuration parameter.

4. A method according to claim 1, wherein the request and response are sent using GPRS.

5. A method according to claim 1, wherein the request and response are sent using SMS.

6. A communication device comprising:
   means for sending a request for time synchronization to a central communications unit through communication data packets via a cellular telephone network;
   means for receiving current time in a response from said central communications unit through communication data packets via the cellular telephone network;
   means for measuring an elapsed time from sending said request to receiving the response and comparing said measured elapsed time with a predetermined first configuration parameter; and means for updating the communication device's own time reference using received current time when said measured elapsed time is less than said first configuration parameter.

7. A communication device according to claim 6, wherein said means for sending a request and for receiving a response comprise a GPRS/SMS interface.

8. A communication device according to claim 6, wherein the device is used as utility meter.

9. A communication device according to claim 6, wherein the device is used as utility meter interface unit linked to several utility meters.

* * * * *